W. H. ZORGER.
LENS FOR AUTOMOBILES.
APPLICATION FILED SEPT. 24, 1918.
1,348,618.
Patented Aug. 3, 1920.
3 SHEETS—SHEET 1.
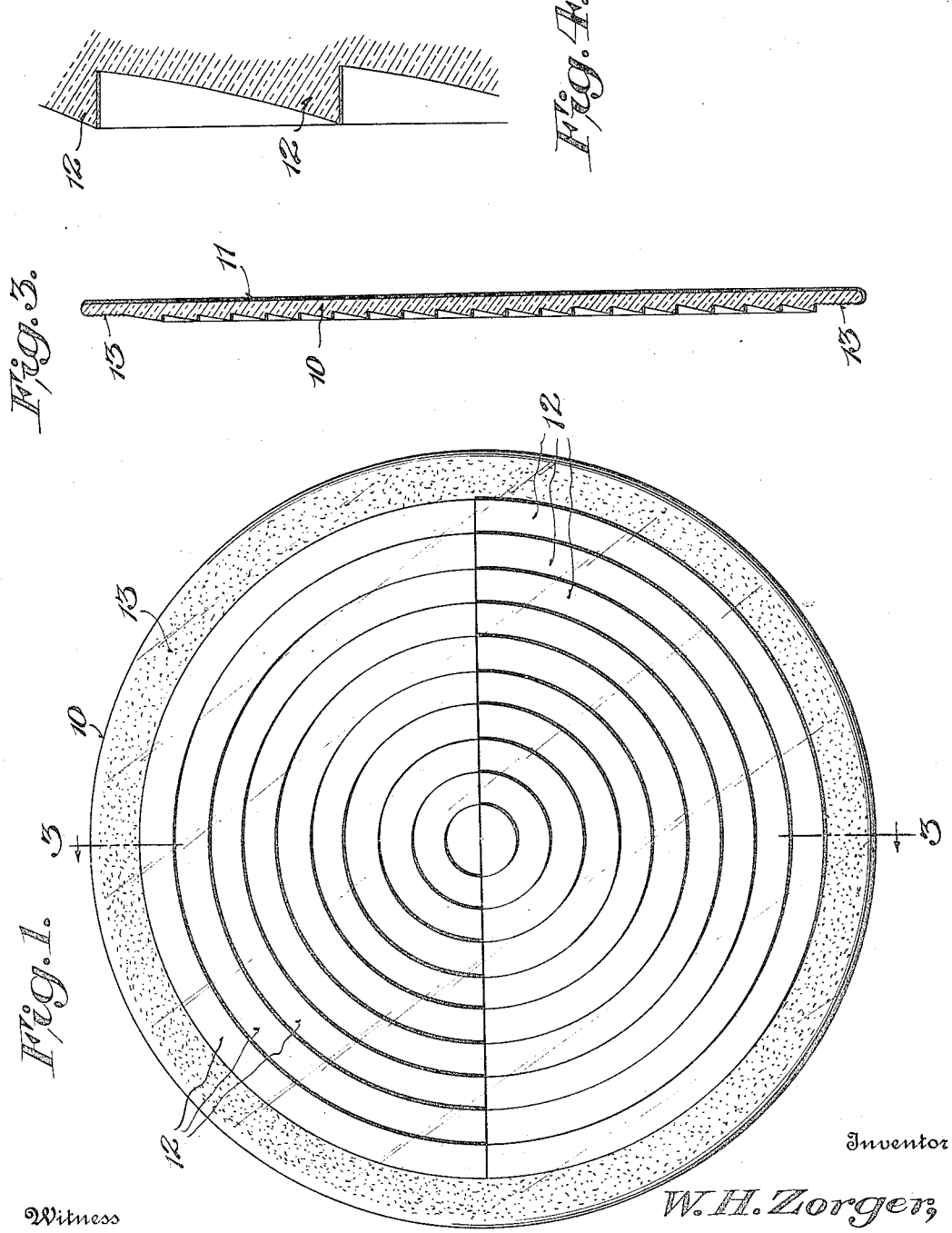

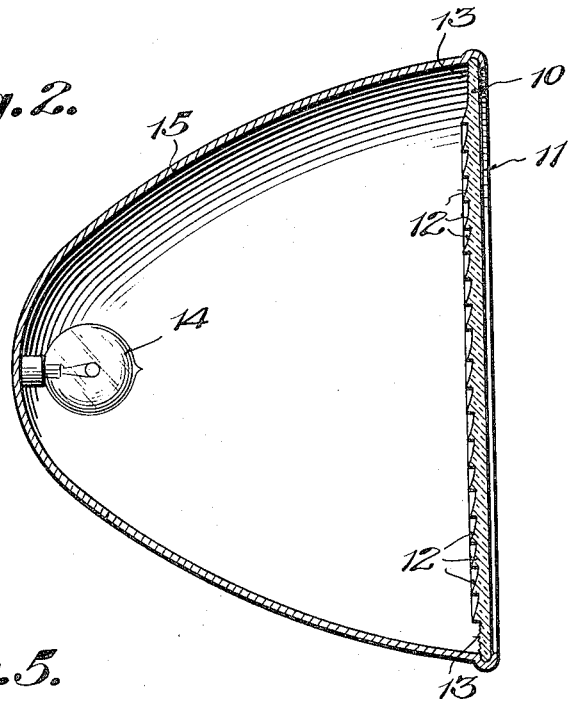
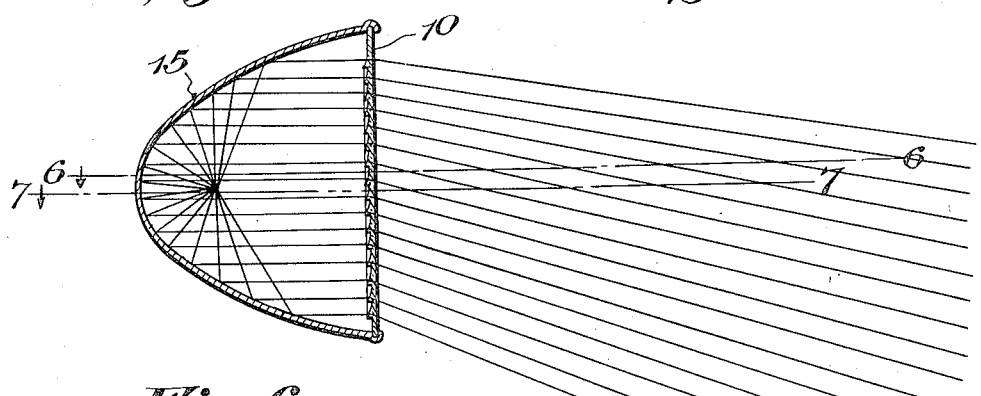
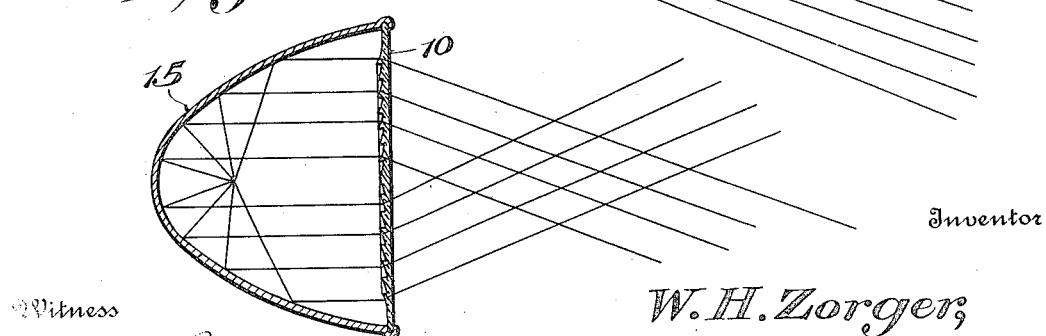

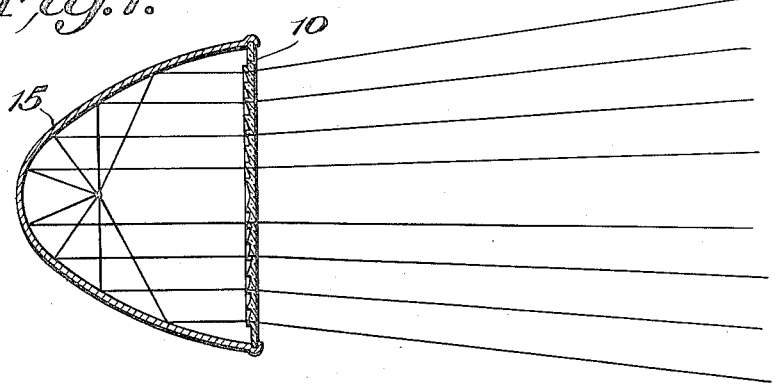
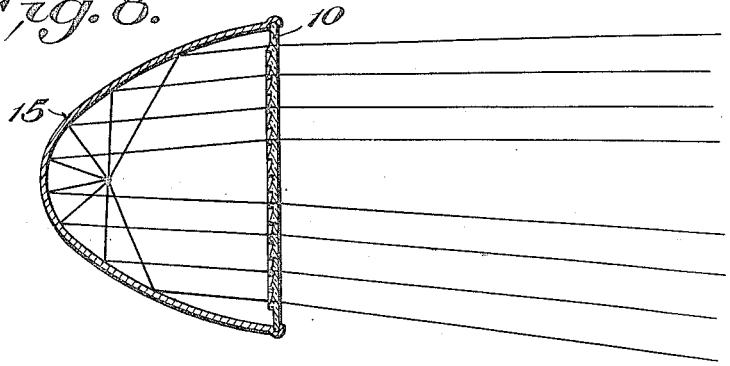
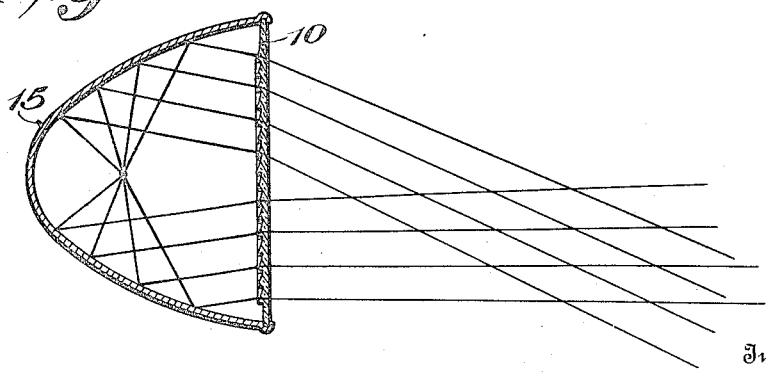

UNITED STATES PATENT OFFICE.

WILLIAM H. ZORGER, OF CHAMPAIGN, ILLINOIS.

LENS FOR AUTOMOBILES.

1,348,618.　　　　Specification of Letters Patent.　　Patented Aug. 3, 1920.

Application filed September 24, 1918. Serial No. 255,453.

*To all whom it may concern:*

Be it known that I, WILLIAM H. ZORGER, a citizen of the United States, residing at Champaign, in the county of Champaign and State of Illinois, have invented new and useful Improvements in Lenses for Automobiles, of which the following is a specification.

My invention relates to lenses for headlights for automobiles, locomotives, and the like.

The invention disclosed herein is in the nature of an improvement on the lens described in my Patent No. 1,246,216, dated November 13, 1917.

The lens which is shown in my former patent is formed with horizontally arranged cylinder surfaces or modified prisms having their bases downwardly for the purpose of refracting downwardly the rays of light which would normally pass above the horizontal plane. In a lens of this type in which the elements are horizontal, the rays of light at the sides, which are more nearly horizontal, are refracted more strongly than those nearer the center along the same element which are inclined to a greater degree from the horizontal. I have found that by arranging the elements annularly or concentrically with the center of the lens this is avoided, and the rays from the upward half of the cone of light can be refracted downwardly so as to coincide with the lower half, or can be directed forwardly as a beam of light, or can be spread so as to illuminate the portion of the road immediately before the vehicle, as desired, merely by changing the position of the source of light with respect to the focus of the reflecting surface.

It is the object of my invention, therefore, to provide a lens which will direct substantially all of the light to or below the horizontal plane thereby complying with the laws of the various States and Territories and at the same time utilizing the light which would otherwise be wasted.

I have found that by making the surfaces of the elements transversely curved the light is somewhat diffused, preventing the formation of dark rings or spots and in the preferred embodiment the elements are formed with concaved surfaces somewhat as if the straight cylinders of my former patent were bent to an annular form concentric with the lens.

These and other advantages of my invention will clearly appear from the following detailed description with reference to the accompanying drawings in which—

Figure 1 is a rear elevational view of a lens embodying my invention.

Fig. 2 is a vertical section of a complete headlight fitted with the preferred form of my invention.

Fig. 3 is a vertical sectional view of a form in which the elements are prismatic in cross-section.

Fig. 4 is a detail sectional view of one of the elements of a lens shown in Fig. 2.

Fig. 5 is a diagrammatic view in vertical section of a headlight fitted with my invention showing the direction of the rays when the light is at the focus of the reflector.

Fig. 6 is a diagrammatic view of a horizontal section on line 6—6 of Fig. 5.

Fig. 7 is a diagrammatic view of a horizontal section on line 7—7 of Fig. 5.

Fig. 8 is a diagrammatic view in vertical section showing the direction of the rays when the light is back of the focus.

Fig. 9 is a diagrammatic view in vertical section showing the direction of the rays when the light is in front of the focus.

The lens 10 is formed of a plate of glass preferably, though not necessarily, having one plane surface 11, the other surface, preferably that toward the source of light, so as to avoid the accumulation of dust and dirt, is formed with reversed series of semi-annular concentric surfaces 12 meeting at the horizontal diameter of the lens. The surfaces which are above the horizontal line are inclined away from the plane of the lens toward the center of the lens and the surfaces below the horizontal line are inclined away from the plane of the lens and toward the circumference so that the lens is in effect formed of a series of semi-annular elements each element being in cross-section in the form of a prism or of a modified prism as will later appear. The elements of the upper half have their bases toward the center and their apices toward the circumference, while those of the lower half have their apices toward the center and their bases toward the circumference. In the preferred embodiment shown in Fig. 2 the prismatic form of the elements is modified by having the inclined surfaces curved for a purpose which will later appear.

The annular portion 13 of the lens outside the outermost surface 12 is preferably stippled for the purpose of diffusing the light passing therethrough.

If the elements are formed exactly prismatic in section as in the form shown in Fig. 3, there is danger of the formation of dark rings. Dark spots are also likely to be formed as a result of the irregularity of the source of light which in this case is the filament of an electric bulb. I prefer, therefore, to form the inner surface of the elements curved on an arc, as shown in Figs. 2, 4 and 5, having a radius of 20 inches, although it is to be understood that the invention is not limited to the dimensions given. As a result of this construction, the light rays passing through the element near the base are refracted to a greater degree than those passing through the apex and the light is spread evenly through the desired range.

As shown in Fig. 2, the lens is placed in front of an ordinary headlight having an incandescent bulb 14 and a parabolic reflector 15. In a headlight of this type the bulb may be placed either at the focus of the reflector, or slightly back of the focus, or slightly in front of the focus. In practice it has been impracticable to use the light at the focus of the reflector for the reason that the rays are then thrown forward parallel as a beam of light but without giving sufficient illumination on the road bed near the vehicle.

It has been the practice to therefore place the light either slightly back of the focus so as to spread the rays directly from the reflector to form a cone of light or slightly in front of the focus so that the rays are crossed and then form a similar cone. In a headlight fitted with my lens it is possible to place the light either in center focus or back of the focus or in front of the focus, for the reason, as will be apparent from the following description, that in each position at least half of the light is transmitted in the form of a spreading half cone, thus giving a good illumination of the road bed.

I have illustrated in Figs. 5, 6 and 7 the manner in which the rays are directed when the light is in center focus. The lower half of the beam of light is spread outwardly and downwardly so as to form a half cone of light having a spread of four feet at a distance of twenty feet, and the upper half of the beam is inverted and similarly spread so as to coincide with the lower half cone of light. Thus all of the light is directed below the horizontal plane. When the light is placed back of the focus as shown in Fig. 8, the rays of the upper half cone of light are refracted so as to be thrown forward in a straight beam of light while the lower half cone of light is spread still farther downwardly and outwardly so as to give a good illumination immediately before the vehicle. A similar result is obtained when the light is in front of the focus except that in this case, as shown in Fig. 9, the lower half cone of light is refracted to form a straight beam of light with parallel rays and the upper half cone of light is inverted and spread to form the illumination of the roadway in front of the vehicle.

It is obvious that the effect of the lens on light will be the same whether the plane surface is placed adjacent the light or away from the light. It is more practical, however, to have the plane surface outwardly as it is more easily cleaned.

While I have shown the lens in form of a flat or planular disk, it is obvious that the disk is not necessarily flat, but may be slightly dished or curved outwardly.

It will be understood that in the drawings I have shown the dimensions and proportions of the refracting elements somewhat exaggerated for the purpose of rendering clearer the principle of my lens. For use with an ordinary automobile headlight very good results are obtained by constructing each refracting element one-eighth of an inch in width with each base 15/1000th (.015) inch in thickness. I do not, however, wish to be limited to any particular dimensions or proportions, since it may be desirable to vary these with varying conditions of use.

I claim:

1. A lens for headlights comprising a disk having its entire light emitting area provided with two series of semi-annular elements arranged concentric with a common center, and having faces parallel throughout the entire series and inclined to the plane of the body of the disk, for the purpose described.

2. A lens for headlights comprising a disk formed of two duplicate series of semi-annular elements arranged concentric with a common center, and each having its opposite faces inclined with respect to each other, all of the inclined faces being parallel throughout the series and the elements above the horizontal diameter of the lens being thickest at the edge adjacent said diameter and the elements below said diameter being reversely positioned, said two series covering the entire light emitting area of the lens.

3. A lens for headlights comprising a disk formed of two duplicate series of semi-annular concentric elements, arranged, respectively, above and below the horizontal diameter of the lens, each element being substantially prismatic in cross section with one face curved, the curved faces being parallel throughout the series, and the elements above said horizontal diameter being arranged with their bases downward and toward the center of the lens and the elements of the lower half of the disk having their bases positioned downward and away from the center of the disk, said two series covering the entire light emitting area of the lens.

4. The combination with a parabolic reflector, of a source of illumination positioned within the reflector, and a lens arranged in front of the reflector and having its entire light emitting area formed by semi-annular concentric prismatic elements arranged respectively, above and below the horizontal diameter of the lens, corresponding faces of all said elements being parallel and all inclined to the plane of the body of the disk.

5. The combination with a parabolic reflector, of a source of illumination positioned within the reflector, and a lens arranged in front of the reflector and comprising two duplicate series of semi-annular concentric prismatic elements, arranged respectively, above and below the horizontal diameter of the lens, the elements above said diameter being arranged with their bases downward and toward the center of the lens, and those of the lower half of the disk having their bases downward and away from the center of the lens, and said elements extending over the entire light emitting area of the lens.

6. The combination with a parabolic reflector of a source of illumination positioned within the reflector, and a lens arranged in front of the reflector, and comprising two duplicate series of semi-annular concentric prismatic elements, arranged, respectively, above and below the horizontal diameter of the lens, each element having one face curved, the elements above said diameter being arranged with their bases downward and toward the center of said lens, and those of the lower half of the disk having their bases arranged downward and away from the center of the lens, and said elements extending over the entire light emitting area of the lens.

7. In a headlight, the combination of a parabolic reflector, a source of illumination within the reflector, and a disk-like lens extending transversely of the reflector in advance of the source of illumination, both the upper and lower halves of said lens being provided with means to produce a downwardly directed half cone of light when the source of illumination is in center focus, and a half cone and a "spot light" effect when the source of illumination is forward or in rear of center focus.

In testimony whereof I have hereunto set my hand.

WILLIAM H. ZORGER.